(12) United States Patent
Eyer et al.

(10) Patent No.: US 7,116,644 B2
(45) Date of Patent: Oct. 3, 2006

(54) DATA SHARING AND LINKAGE FOR IP TELEPHONY SET-TOP BOXES

(75) Inventors: Mark Kenneth Eyer, San Diego, CA (US); Matthew S. Chang, San Diego, CA (US); Aditya Krishnan, San Diego, CA (US); Andrew M. Proehl, San Francisco, CA (US); David K. L. Yang, San Jose, CA (US); Frederick J. Zustak, Poway, CA (US); Peter Rae Shintani, San Diego, CA (US); Nicholas Colsey, Del Mar, CA (US); Brant L. Candelore, Escondido, CA (US); Dayan Ivy Golden, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1106 days.

(21) Appl. No.: 09/993,339

(22) Filed: Nov. 14, 2001

(65) Prior Publication Data

US 2003/0093808 A1 May 15, 2003

(51) Int. Cl.
*H04L 5/20* (2006.01)

(52) U.S. Cl. .................... 370/273; 370/352

(58) Field of Classification Search ............... 370/329, 370/352, 521, 524, 337–347, 466
See application file for complete search history.

(56) References Cited

U.S. PATENT DOCUMENTS

| | | | |
|---|---|---|---|
| 5,818,825 A * | 10/1998 | Corrigan et al. | 370/329 |
| 5,881,131 A * | 3/1999 | Farris et al. | 379/15.03 |
| 6,377,570 B1 * | 4/2002 | Vaziri et al. | 370/352 |
| 6,452,923 B1 * | 9/2002 | Gerszberg et al. | 370/352 |

* cited by examiner

Primary Examiner—Hassan Kizou
Assistant Examiner—Salman Ahmed
(74) Attorney, Agent, or Firm—Miller Patent Services; Jerry A. Miller (57) ABSTRACT

A data sharing methodology and structure for communication between users of digital Internet-accessible devices, such as set-top boxes, is described. Users of Internet-accessible devices can establish connections between trusted users of other Internet-accessible devices and transfer personal information using either the Internet or the public switched telephone network (PSTN). Some examples of the type of information that may be transferred include IP addresses, e-mail, multimedia objects, and voice data. Once personal identification information has been exchanged, future communications may be easily re-established and maintained.

26 Claims, 5 Drawing Sheets

DATA SHARING AND LINKAGE FOR IP TELEPHONY SET-TOP BOXES

BACKGROUND OF THE INVENTION

1. Technical Field

This invention relates generally to the field of multimedia processing systems and more specifically to data sharing and linkage for Internet Protocol telephony set-top boxes.

2. Discussion of the Prior Art

Various methods for communicating personal multimedia information are well known in the art. For instance, when two individuals wish to communicate information relating to their television and Internet viewing interests, this is most often accomplished using e-mail services, hand-written notes, telephone calls, and even the postal service.

The exchange of e-mail addresses is often done over the telephone, which increases the possibility of making an error. Other types of personal information, such as television viewing preferences, family or personal audio-video data such as photo archives and activity schedules, mailing addresses, address books or other contact information, favorite websites, personal writings such as personal reviews of events viewed, MP3 audio files, and travel itineraries, etc., are difficult or impossible to communicate orally. These types of personal information are often sent using the U.S. Postal mail service or a commercial package handler. Communicating personal preferences using these standard approaches can be costly, error-prone, and time consuming. This process becomes even more expensive as the distance between the users increases.

SUMMARY OF THE INVENTION

It is an object of the invention to provide a mechanism whereby persons may exchange all manner of personal information between remote locations via Internet-accessible devices in a manner that can be flexible, efficient, fast, reliable and inexpensive.

According to the present invention, a method and system for the establishment of a data link and the transfer of personal information using Internet-accessible devices, such as set-top boxes, is disclosed. According to the method of an exemplary embodiment of the present invention, user A of a set-top box initiates a data link with user B of another set-top box. The data link is initially established when user A makes a telephone call to user B via the IP telephony capabilities of their set-top boxes. This call can be placed using a connection from the set-top box to the Public Switched Telephone Network (PSTN), or it may be placed using other transmission paths, including the Internet. After user A and user B have established voice communication, either user A or user B may initiate a data transfer using the transmission path established by the telephone call. This data transfer may temporarily interrupt the voice communication between user A and user B, depending upon the transmission media used. This data transfer is facilitated by the use of transmit/receive devices, such as modems, in the set-top boxes of user A and user B. Via the digital connection established between the two set-top box devices, a data link is established. Some of the data transferred may include IP addresses, e-mail addresses, and other identifying information. Each data transfer between the set-top boxes of user A and user B is completed using an acknowledgement by the receiving set-top box.

At the completion of the modem communication between the set-top box of user A and the set-top box of user B, voice communication is re-established (in those implementations where it was interrupted). The set-top boxes of user A and user B may now communicate with one another digitally at the discretion of either user. This data link, once established, may be used to exchange personal information without the need to make any additional telephone calls. This personal information may include, but is not limited to, Internet Protocol addresses, Media Access Control addresses, e-mail addresses, mailing addresses, television viewing history and television viewing preferences, photography archives, personal or family schedules, address books, favorite web sites, audio files, video files, and travel itineraries, etc. This data link may also be used to achieve voice communication over the Internet without the PSTN. This data link may be maintained for long periods of time since set-top box A and set-top box B may update each other when their data link status changes; if the shared data between the boxes changes, those changes can be communicated immediately. Also, this manner of communication may be used by a number of set-top box users.

According to the system of the present invention, a user A has an interface with an Internet-accessible device and a plurality of other users have interfaces to similarly configured Internet-accessible devices, such as set-top boxes. These Internet-accessible devices can have an interface to many types of transmission paths, including the Internet, the PSTN, cable networks, wireless transmission paths, optical transmission paths, and microwave transmission paths. The Internet-accessible device may be attached to audio/visual devices, Internet devices, a service provider, voice grade communication devices, and remote control units. Through the use of the available transmission paths, the Internet-accessible device of user A and the plurality of Internet-accessible devices of other users may establish a data link which allows the transfer of personal information to occur between the Internet-accessible device of user A and the Internet-accessible devices of the other users.

BRIEF DESCRIPTION OF THE DRAWINGS

The novel features believed characteristic of the invention are set forth in the claims. The invention itself, however, as well as a preferred mode of use, and further objects and advantages thereof, will best be understood by reference to the following detailed description of an illustrative embodiment when read in conjunction with the accompanying drawings, wherein:

DESCRIPTION OF THE INVENTION

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the description below, like reference numerals are used to describe the same, similar or corresponding parts in the several views of the drawings.

Figure 1:
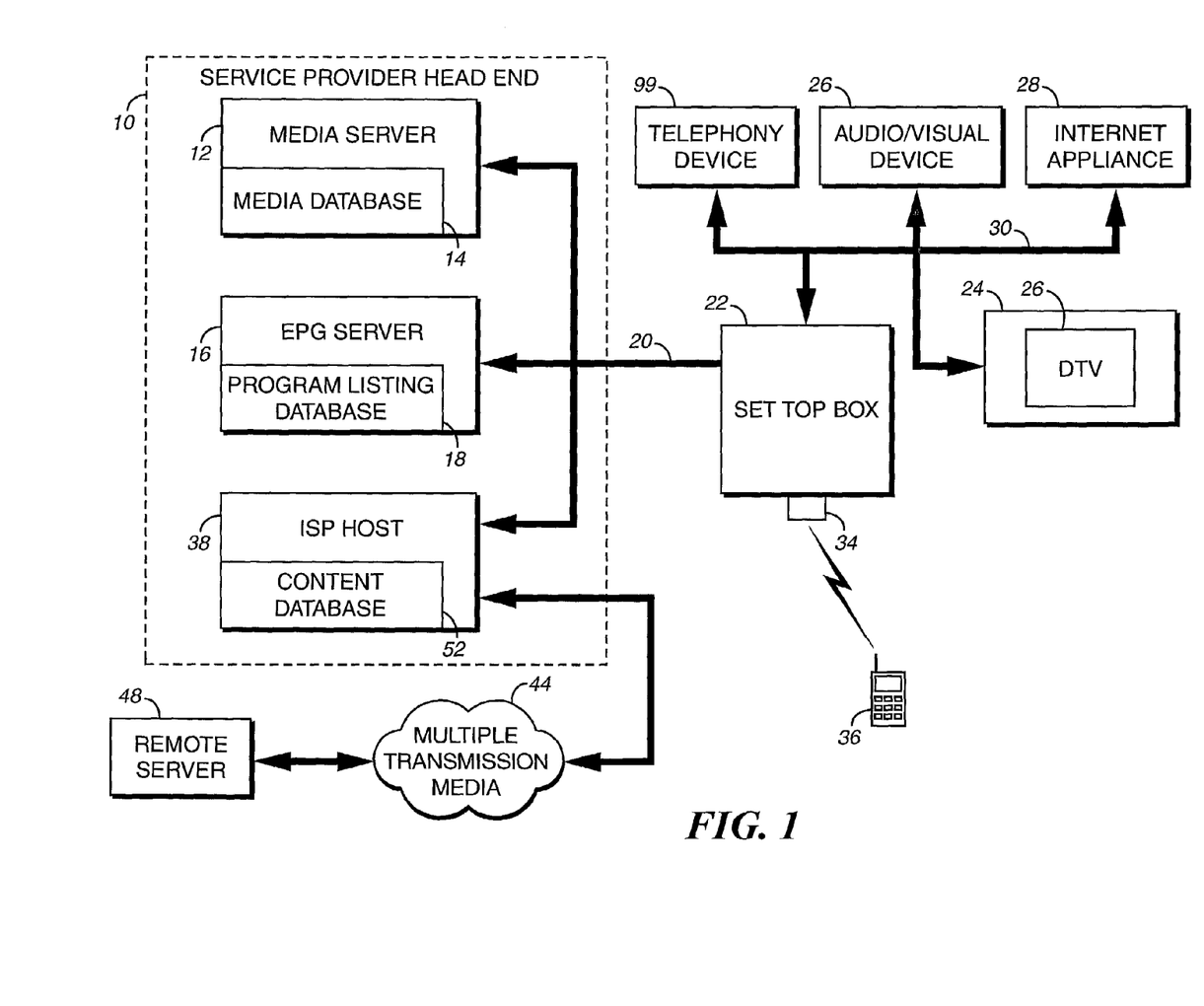
FIG. 1 is a system-level drawing describing the interconnections between a set-top box and the optical and electronic devices it can be attached to, in accordance with the present invention.

Referring to FIG. 1, a block diagram for an exemplary interactive cable or satellite television (TV) system 100 is shown. The system 100 includes, at a head end of the service provider 10, a media server 12 for providing, on demand, movies and other programming obtained from a media database 14. The media server 12 might also provide additional content such as interviews with the actors, games, advertisements, available merchandise, associated Web pages, interactive games and other related content. The system 100 also includes an electronic programming guide (EPG) server 16 and a program listing database 18 for generating an EPG; subscriber information database 19 provides stored information concerning particular subscribers and is coupled to processing unit 40. Set-top box 22 can generally provide for bidirectional communication over a transmission medium 20 in the case of a cable STB 22. In other embodiments, bidirectional communication can be effected using asymmetrical communication techniques possibly using dual communication media—one for the uplink and one for the downlink. In any event, the STB 22 can have its own Universal Resource Locator (URL) or IP address or other unique identifier assigned thereto to provide for addressability by the head end and users of the Internet.

The media server 12 and EPG server 16 are operatively coupled by transmission medium 20 to a set-top box (STB) 22. The transmission medium 20 may include, for example, a conventional coaxial cable network, a fiber optic cable network, telephone system, twisted pair, a satellite communication system, a radio frequency (RF) system, a microwave system, other wireless systems, a combination of wired and wireless systems or any of a variety of known electronic transmission media. In the case of a cable television network, transmission medium 20 is commonly realized at the subscriber's premises as a coaxial cable that is connected to a suitable cable connector at the rear panel of the STB 22. In the case of a Direct Satellite System (DSS), the STB 22 is often referred to as an Integrated Receiver Decoder (IRD). In the case of a DSS system, the transmission medium is a satellite transmission at an appropriate microwave band. Such transmissions are typically received by a satellite dish antenna with an integral Low Noise Block (LNB) that serves as a down-converter to convert the signal to a lower frequency for processing by the STB 22.

The exemplary system 100 further includes a TV 24, such as a digital television, having a display 26 for displaying programming, an EPG, etc. The STB 22 may be coupled to the TV 24 and various other audio/visual devices 26 (such as audio systems, Personal Video Recorders (PVRs), Video Tape Recorders (VTRs), Video Cassette Recorders (VCRs) and the like), storage devices (e.g., hard disc drives), telephony devices 99 and Internet Appliances 28 (such as email devices, home appliances, storage devices, network devices, and other Internet Enabled Appliances) by an appropriate interface 30, which can be any suitable analog or digital interface. In one embodiment, interface 30 conforms to an interface standard such as the Institute of Electrical and Electronics Engineers (IEEE) 1394 standard, or other suitable interface.

The STB 22 may include a central processing unit (CPU) such as a microprocessor and memory such as Random Access Memory (RAM), Read Only Memory (ROM), flash memory, mass storage such as a hard disc drive, floppy disc drive, optical disc drive or may accommodate other electronic storage media, etc. Such memory and storage media is suitable for storing data as well as instructions for programmed processes for execution on the CPU, as will be discussed later. Information and programs stored on the electronic storage media or memory may also be transported over any suitable transmission medium such as that illustrated as 20. STB 22 may include circuitry suitable for audio decoding and processing, the decoding of video data compressed in accordance with a compression standard such as the Motion Pictures Experts Group (MPEG) standard and other processing to form a controller or central hub. Alternatively, components of the STB 22 may be incorporated into the TV 24 itself, thus eliminating the STB 22. Further, a computer having a tuner device and modem may be equivalently substituted for the TV 24 and STB 22.

By way of example, the STB 22 may be coupled to devices such as a personal computer, video cassette recorder, camcorder, digital camera, personal digital assistant and other audio/visual or Internet related devices. In addition, a data transport architecture may be utilized to enable interoperability among devices on a network regardless of the manufacturer of the device if the manufacturers agree to adhere to an industry standard. The STB 22 runs an operating system suitable for a home network system.

The STB 22 includes an infrared (IR) receiver 34 for receiving IR signals from an input device such as remote control 36. Alternatively, it is noted that many other control communication methods may be utilized besides IR, such as wired or wireless radio frequency, etc. In addition, it can be readily appreciated that the input device 36 may be any device suitable for controlling the STB 22 such as a remote control, personal digital assistant, laptop computer, keyboard or computer mouse. In addition, an input device in the form of a control panel located on the TV 24 or the STB 22 can be provided.

The STB 22 may also be coupled to an independent service provider (ISP) host 38 by a suitable connection including dial-up connections, DSL (Digital Subscriber Line) or the same transmission medium 20 described above (e.g., using a cable modem) to, thus, provide access to services and content from the ISP and the Internet. The ISP host 38 provides various content to the user that is obtained from a content database 42. STB 22 may also be used as an Internet access device to obtain information and content from remote servers such as remote server 48 via the Internet 44 using host 38 operating as an Internet portal, for example. In certain satellite STB environments, the data can be downloaded at very high speed from a satellite link, with asymmetrical upload speed from the set-top box provided via a dial-up or DSL connection.

While the arrangement illustrated in FIG. 1 shows a plurality of servers and databases depicted as independent devices, any one or more of the servers can operate as server software residing on a single computer. Moreover, although not explicitly illustrated, the servers may operate in a coordinated manner under centralized or distributed control to provide multiple services as a Multiple Service Operator (MSO) in a known manner. Additionally, the services provided by the servers shown in FIG. 1 may actually reside in other locations, but from the perspective of the user of STB 22, the service provider 10 serves as a portal to the services shown. Those skilled in the art will appreciate that the illustration of FIG. 1 represents a simplified depiction of a cable system configuration shown simply as service provider 10. The simplified illustration shown is intended to simplify the discussion of the service provider 10's operation without unnecessarily burdening the discussion with architectural details that will be evident to those skilled in the art. Many of those details can be found in the publicly available CableLabs OpenCable™ specifications or in the text "OpenCable Architecture (Fundamentals)" by Michael Adams, Cisco Press, November 1999.

Figure 2:
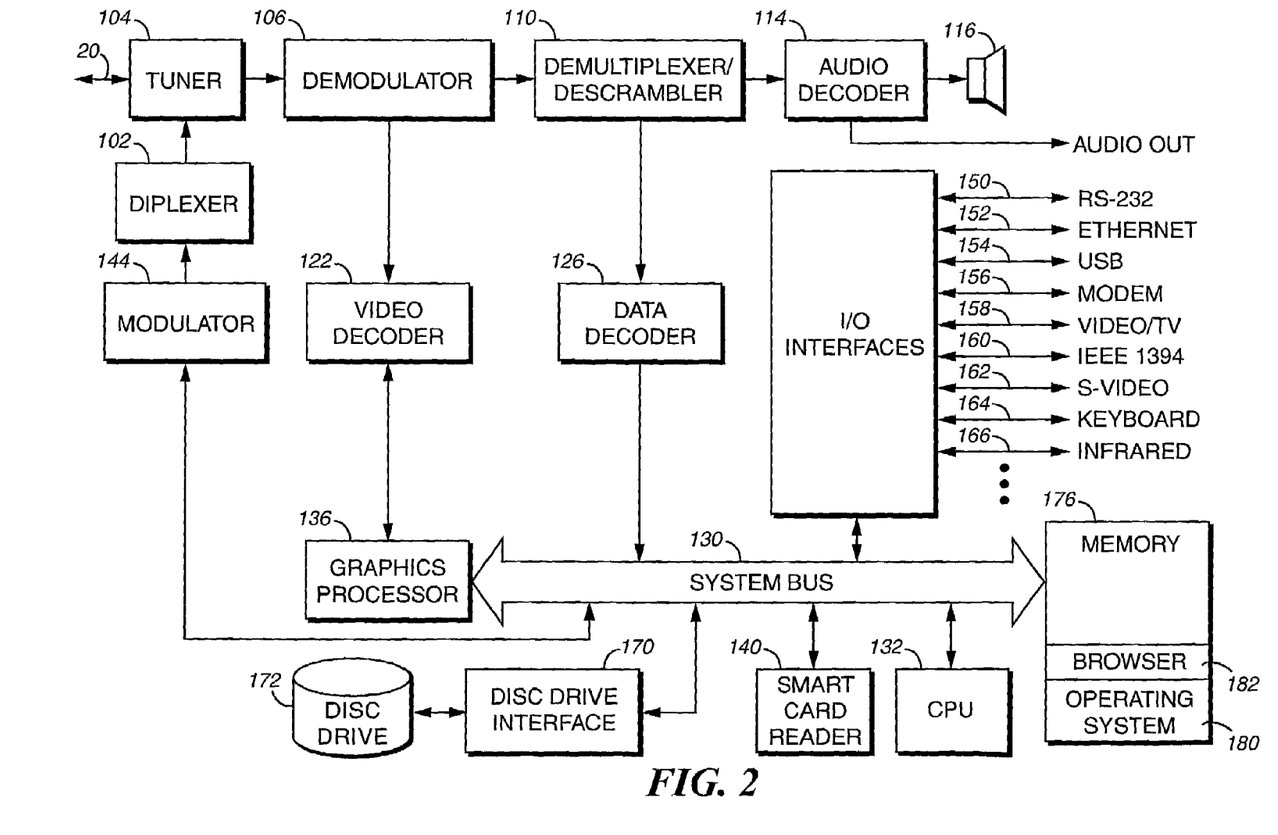
FIG. 2 is a drawing of the sub-systems that comprise the set-top box, as well as the various types of input/output interfaces to the set-top box, in accordance with the present invention.

Referring now to FIG. 2, a typical system configuration for a digital set-top box 22 is illustrated. In this exemplary set-top box, the transmission medium 20, such as a coaxial cable, is coupled by a suitable interface through a diplexer 102 to a tuner 104. Tuner 104 may, for example, include a broadcast in-band tuner for receiving content, an out-of-band (OOB) tuner for receiving data transmissions. A return path through diplexer 102 provides an OOB return path for outbound data (destined for example for the head end). A separate tuner (not shown) may be provided to receive conventional RF broadcast television channels. Modulated information formatted, for example, as MPEG-2 information is then demodulated at a demodulator 106. The demodulated information at the output of demodulator 106 is provided to a demultiplexer and descrambler circuit 110 where the information is separated into discrete channels of programming. The programming is divided into packets, each packet bearing an identifier called a Packet ID (PID) that identifies the packet as containing a particular type of data (e.g., audio, video, data). The demodulator and descrambler circuit 110 also descrambles scrambled information in accordance with a decryption algorithm to prevent unauthorized access to programming content, for example.

Audio packets from the demultiplexer 110 (those identified with an audio PID) are decrypted and forwarded to an audio decoder 114 where they may be converted to analog audio to drive a speaker system (e.g., stereo or home theater multiple channel audio systems) or other audio system 116 (e.g., stereo or home theater multiple channel amplifier and speaker systems) or may simply provide decoded audio out at 118. Video packets from the demultiplexer 110 (those identified with a video PID) are decrypted and forwarded to a video decoder 122. In a similar manner, data packets from the demultiplexer 110 (those identified with a data PID) are decrypted and forwarded to a data decoder 126.

Decoded data packets from data decoder 126 are sent to the set-top box's computer system via the system bus 130. A central processing unit (CPU) 132 can thus access the decoded data from data decoder 126 via the system bus 130. Video data decoded by video decoder 122 is passed to a graphics processor 136, which is a computer optimized to processes graphics information rapidly. Graphics processor 136 is particularly useful in processing graphics intensive data associated with Internet browsing, gaming and multimedia applications. It should be noted, however, that the function of graphics processor 136 may be unnecessary in some set-top box designs having lower capabilities, and the function of the graphics processor 136 may be handled by the CPU 132 in some applications where the decoded video is passed directly from the demultiplexer 110 to a video encoder. Graphics processor 136 is also coupled to the system bus 130 and operates under the control of CPU 132.

Many set-top boxes such as STB 22 may incorporate a smart card reader 140 for communicating with a so-called "smart card," often serving as a Conditional Access Module (CAM). The CAM typically includes a central processor unit (CPU) of its own along with associated RAM and ROM memory. Smart card reader 140 is used to couple the system bus of STB 22 to the smart card serving as a CAM (not shown). Such smart card based CAMs are conventionally utilized for authentication of the user and authentication of transactions carried out by the user as well as authorization of services and storage of authorized cryptography keys. For example, the CAM can be used to provide the key for decoding incoming cryptographic data for content that the CAM determines the user is authorized to receive.

STB 22 can operate in a bidirectional communication mode so that data and other information can be transmitted not only from the system's head end to the end user, or from a service provider to the end user of the STB 22, but also, from the end user upstream using an out-of-band channel. In one embodiment, such data passes through the system bus 130 to a modulator 144 through the diplexer 102 and out through the transmission medium 20. This capability is used to provide a mechanism for the STB 22 and/or its user to send information to the head end (e.g., service requests or changes, registration information, etc.) as well as to provide fast outbound communication with the Internet or other services provided at the head end to the end user.

Set-top box 22 may include any of a plurality of I/O (Input/Output) interfaces represented by I/O interfaces 146 that permit interconnection of I/O devices to the set-top box 22. By way of example, and not limitation, a serial RS-232 port 150 can be provided to enable interconnection to any suitable serial device supported by the STB 22's internal software. Similarly, communication with appropriately compatible devices can be provided via an Ethernet port 152, a USB (Universal Serial Bus) port 154, a modem port 162, an IEEE 1394 (so-called firewire™ or i-LINK™) or IEEE 1394 port 156, S-video port 158 or infrared port 160. Such interfaces can be utilized to interconnect the STB 22 with any of a variety of accessory devices such as storage devices, audio/visual devices 26, telephony devices 99, gaming devices (not shown), Internet Appliances 28, etc.

I/O interfaces 146 can include a modem (be it dial-up, cable, DSL or other technology modem) having a modem port 162 to facilitate high speed or alternative access to the Internet or other data communication functions. In one preferred embodiment, modem port 162 is that of a DOCSIS (Data Over Cable System Interface Specification) cable modem to facilitate high speed network access over a cable system, and port 162 is appropriately coupled to the transmission medium 20 embodied as a coaxial cable. Thus, the STB 22 can carry out bidirectional communication via the DOCSIS cable modem with the STB 22 being identified by a unique IP address. The DOCSIS specification is publicly available. Of course, it is envisioned that the modem can be built into the set-top box.

A PS/2 or other keyboard/mouse/joystick interface such as 164 can be provided to permit ease of data entry to the STB 22. Such inputs provide the user with the ability to easily enter data and/or navigate using pointing devices. Pointing devices such as a mouse or joystick may be used in gaming applications.

Of course, STB 22 also may incorporate basic video outputs 166 that can be used for direct connection to a television set such as 24 instead of (or in addition to) an IEEE 1394 connection such as that illustrated as 30. In one embodiment, Video output 166 can provide composite video formatted as NTSC (National Television System Committee) video.

The infrared port 160 can be embodied as an infrared receiver 34 as illustrated in FIG. 1, to receive commands from an infrared remote control 36, infrared keyboard or other infrared control device. Although not explicitly shown, front panel controls may be used in some embodiments to directly control the operation of the STB 22 through a front panel control interface as one of interfaces 146. Selected interfaces such as those described above and others can be provided in STB 22 in various combinations as required or desired.

STB 22 will more commonly, as time goes on, include a disc drive interface 170 and disc drive mass storage 172 for user storage of content and data as well as providing storage of programs operating on CPU 132. STB 22 may also include floppy disc drives, CD ROM drives, CD R/W drives, DVD drives, etc. CPU 132, in order to operate as a computer, is coupled through the system bus 130 (or through a multiple bus architecture) to memory 176. Memory 178 may include a combination any suitable memory technology including Random Access Memory (RAM), Read Only Memory (ROM), Flash memory, Electrically Erasable Programmable Read Only Memory (EEPROM), etc.

While the above exemplary system including STB 22 is illustrative of the basic components of a digital set-top box suitable for use with the present invention, the architecture shown should not be considered limiting since many variations of the hardware configuration are possible without departing from the present invention. The present invention could, for example, also be implemented in more advanced architectures such as that disclosed in U.S. patent application Ser. No. 09/473,625, filed Dec. 29, 1999, Docket No. SONY-50N3508 entitled "Improved Internet Set-Top Box Having and In-Band Tuner and Cable Modem" to Jun Maruo and Atsushi Kagami. This application describes a set-top box using a multiple bus architecture with a high level of encryption between components for added security. This application is hereby incorporated by reference as though disclosed fully herein.

In general, during operation of the STB 22, an appropriate operating system 180 is loaded into, or is permanently stored in, active memory along with the appropriate drivers for communication with the various interfaces. In other embodiments, other operating systems such as Microsoft Corporation's Windows CETM could be used without departing from the present invention. Along with the operating system and associated drivers, the STB 22 usually operates using browser software 182 in active memory or browser software may permanently reside in ROM, EEPROM or Flash memory, for example. The browser software 182 may operate as the mechanism for viewing web pages on the Internet, and can also serve as the mechanism for viewing an Electronic Program Guide (EPG) formatted as an HTML document.

STB software architectures vary depending upon the operating system. However, in general, all such architectures generally include, at the lowest layer, various hardware interface layers. Next is an operating system layer as previously described. The software architectures of modern STB have generally evolved to include a next layer referred to as "middleware." Such middleware permits applications to run on multiple platforms with little regard for the actual operating system in place. Middleware standards are still evolving at this writing, but are commonly based upon Javascript and HTML (hypertext Markup Language) virtual machines. At the top layer is the application layer where user applications and the like reside, e.g., browsing, email, EPG, Video On Demand (VOD), rich multimedia applications, pay per view, etc. The current invention can be utilized with any suitable set-top box software and hardware architecture.

Figure 3:
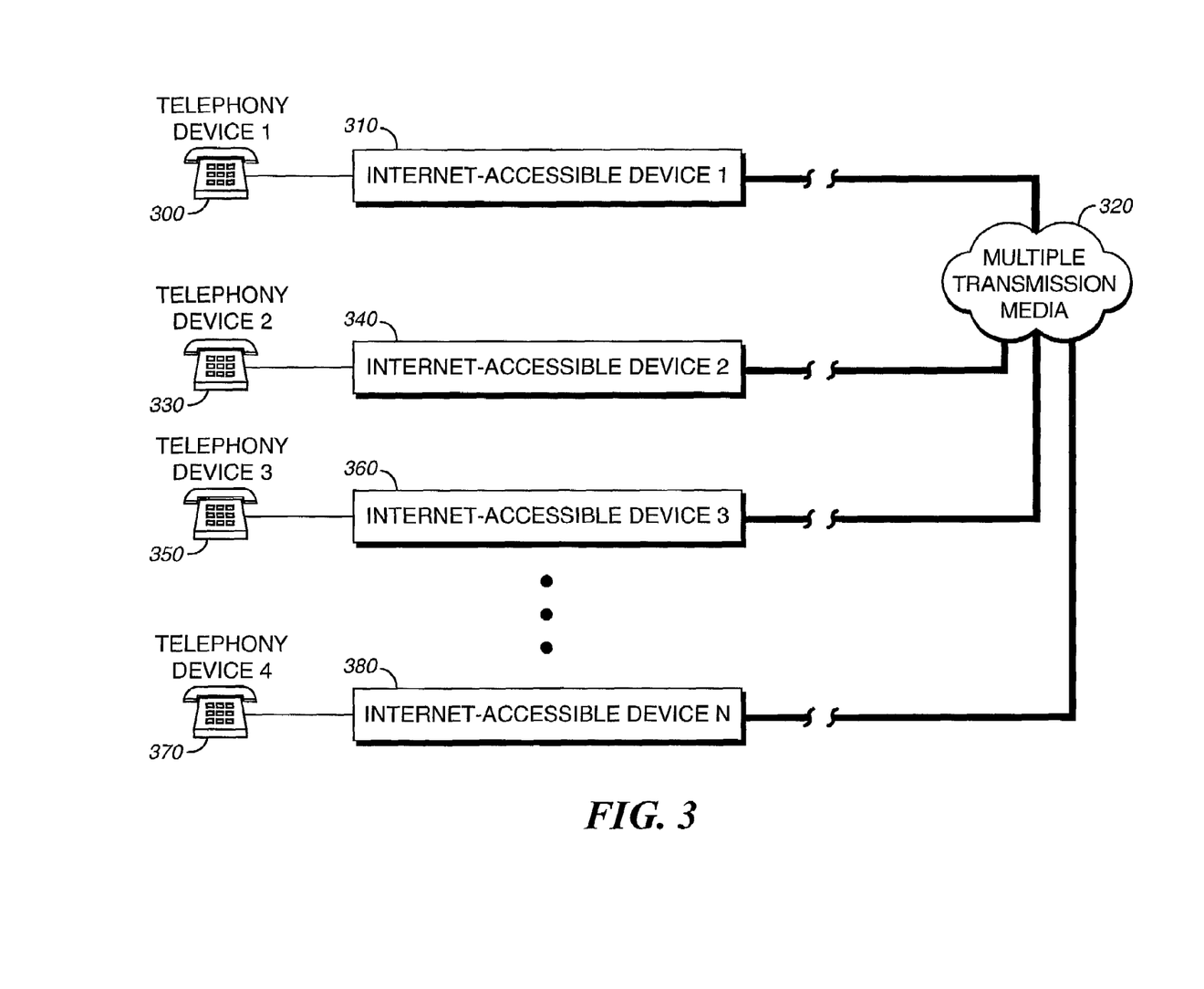
FIG. 3 is a high-level block diagram showing the use of a plurality of Internet-accessible devices for the exchange of all manner of personal information, in accordance with the present invention.

Referring now to FIG. 3, a generic drawing of a data linkage between a plurality of Internet-accessible devices using a plurality of transmission media is shown. A first telephony device 300 is coupled to a first input/output terminal of a first Internet-accessible device 310. A plurality of input/output terminals of the Internet-accessible device 310 is coupled to a plurality of transmission media 320. The plurality of transmission media 320 is coupled to a plurality of Internet-accessible devices 340,360 380, thereby enabling the establishment of a data link between the first Internet-accessible device and a plurality of Internet-accessible devices. Note that these Internet-accessible devices may include set-top boxes, palmtops, properly configured computers, and other devices capable of communication using the transmission media 320. It is understood that the use of the term "link" or "linkage" implied the ability to send data back and forth. Linkage protocols suitable for use in the present invention may be IP-based, such as TCP/IP, UDP/IP, FTP, RTP, etc.

Figure 4:
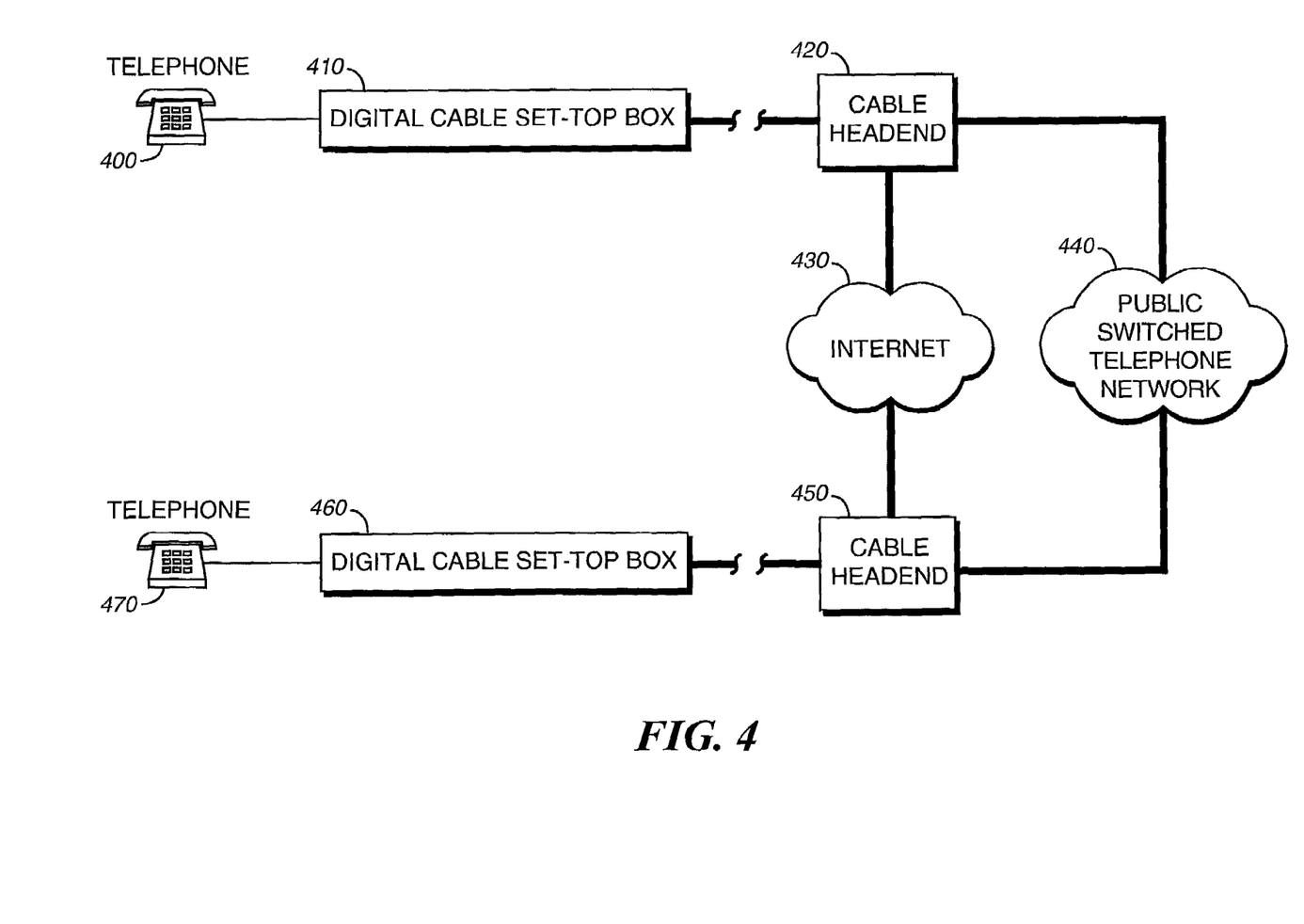
FIG. 4 is a high-level representation of two set-top boxes and some of the available transmission paths that may be used to connect them, in accordance with the present invention.

Referring now to FIG. 4, a simplified drawing of a data link between a first set-top box 410 or other suitable Internet-accessible device and a second set-top box 460 or other suitable Internet-accessible device, such as a personal computer, is shown. A first telephone 400 is connected to a first communication port of the first set-top box 410. The first set-top box 410 is coupled through an input/output terminal to a first cable system headend 420. In a similar manner, a second telephone 470 is connected to a communication port of the second set-top box 460. The second set-top box 460 is coupled through an input/output terminal to a second cable system headend 450. The second cable system headend 450 and the first cable system headend 420 are coupled through a transmission media, such as an Internet 430 and/or a packet switched telephone network 450. When the transmission media is the Internet 430, Internet Protocol datagrams are transmitted. Internet protocols are used to carry voice samples in digital format between the first set-top box 410 and the first cable system headend 420. When the transmission media is the Public Switched Telephone Network, at the first cable headend 420, if the call involves a destination outside the cable plant, the call is converted to analog format and connected to a long-distance carrier through the public switched telephone network 440. When the data is received at the second cable headend 450, it is converted to an appropriate set-top box format and transmitted to the second set-top box 460. This data transmission may then be made available to a listener at telephone 470. It is noted that cable system headends 420 and 450 are analogous in function to headend of service provider 10 of FIG. 1.

Figure 5:
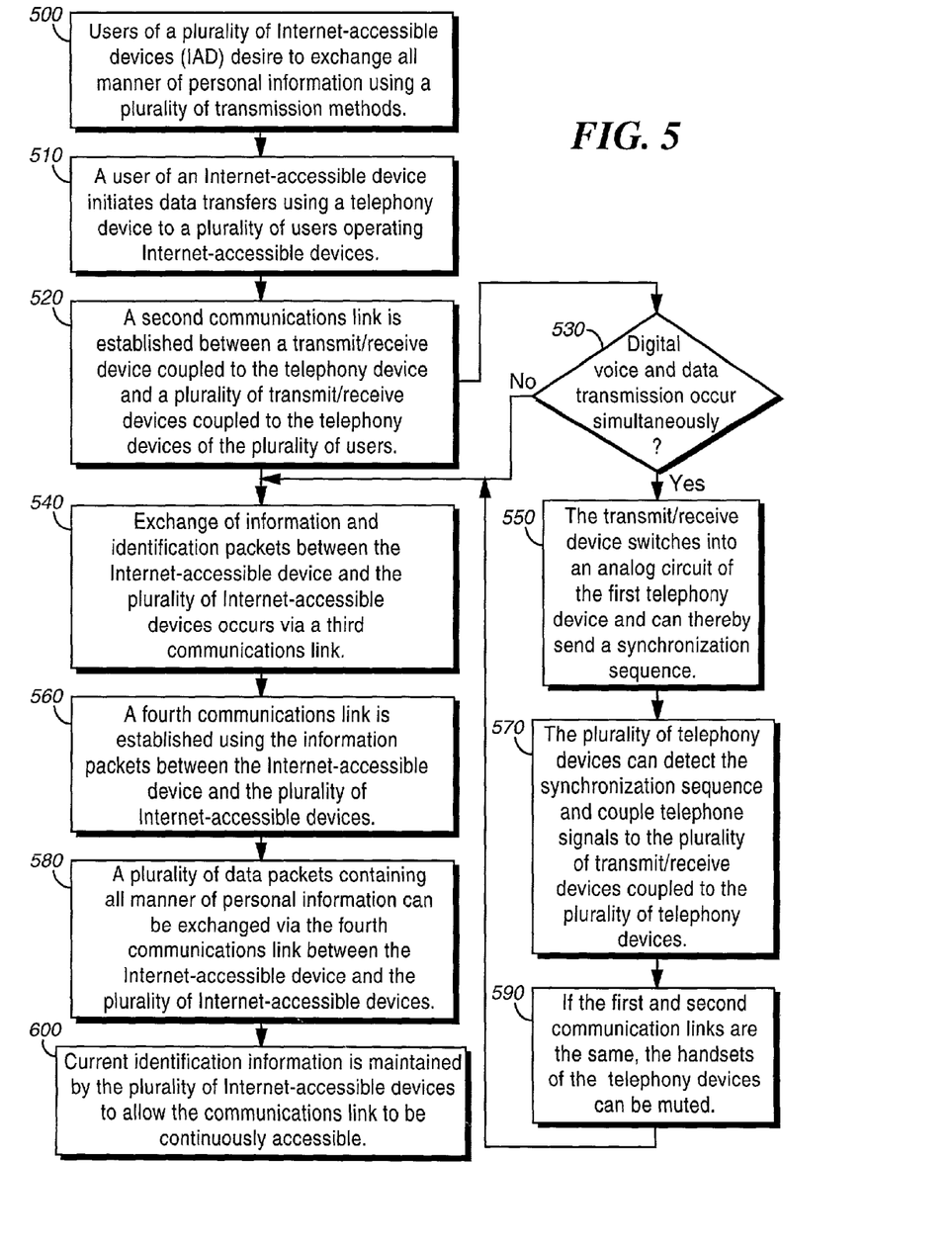
FIG. 5 is a flow chart of the method of the present invention.

Referring now to FIG. 5, a flow diagram of the method of data sharing and linkage between Internet Protocol telephony Internet-accessible devices, in accordance with the present invention, is shown. While the term Internet-accessible devices is used in FIG. 5, it will be clear to one skilled in the art that set-top boxes or other devices (computers, laptops, workstations, etc.) capable of communicating with the Internet in a multimedia environment could be used without departing from the spirit and scope of the present invention. It will also be clear to one skilled in the art that telephony devices could be telephones, computers, or other devices capable of transmitting, processing, and receiving information over the standard voice-grade channel. Users of a plurality of such Internet-accessible devices (IAD) desire to exchange all manner of personal information using transmission media, which may include, for example, the Internet, a Public Switched Telephone Network (PTSN), an optical communication system, a Radio-Frequency communication system, a microwave communication system, etc. The users desire some control over the amount of personal information, type of personal information, who the personal information is sent to, and when the personal information is transmitted, as demonstrated in Block 500. This control is established by each user's individual security policy, which governs the amount, type, destination, and timeliness of the personal information exchanged between users. The format and data types included in the data packets exchanged between users are determined by the devices attached to the Internet-accessible devices and the specific physical and link layer protocols employed by the individual devices.

A first user of a first Internet-accessible device initiates a data transfer over a first communications link between the first Internet-accessible device, coupled to a first telephony device usable by the first user, and a plurality of Internet-accessible devices, coupled to a plurality of telephony devices and usable by the users, as illustrated in Block 510. The first communication link could be established using any of the available transmission media. The first communication link is a person to person telephone call between the first telephone device and a second telephony device usable by a second user, in the preferred embodiment. It should be noted that the term communication link implies that the first telephony device and the second telephony device have established a communication path through which data may be exchanged. Also, note that a broadcast communication, or a similar technique could be used to establish communication between the first user and the plurality of users. Prior to this initiation of a data transfer, either user may configure the Internet-accessible devices used to exchange personal information.

At Block 520, a second communications link is established between a transmit/receive device coupled to the first telephony device and transmit/receive devices coupled to the telephony devices usable by the users. The second communications link can be established using any of the available transmission media, and can further be the same as the first communication link.

If a device capable of handling simultaneous voice and data transmission is used as the transmit/receive device, as determined at Decision Block 530, then the transmit/receive device switches into an analog circuit of the first telephony device and can thereby send a synchronization sequence for receipt by the transmit/receive devices of the telephony devices at Block 550. The telephony devices can detect the synchronization sequence and couple a plurality of telephone signals of the first telephony device to the transmit/receive devices coupled to the telephony devices at Block 570. If the first communication link is the same as the second communication link, handsets of the telephony devices can be muted at Block 590.

Exchange of a plurality of information and identification packets between the first Internet-accessible device and the other Internet-accessible devices occurs via a third communications link that can use the transmission media occurs at Block 540. This exchange of information and identification packets can include acknowledgment that the packets have been correctly received by the Internet-accessible device. The information and identification packets allow the users of the Internet-accessible devices to establish a data link amongst the plurality of Internet-accessible devices. The information and identification packets can include e-mail address, Media Access Control addresses, phone numbers, US Postal Service addresses, websites, Internet Protocol addresses, etc.

At Block 560, a fourth communication link is established using the information and identification packets exchanged via the third communications link, which can use any of the transmission media and is established between the first Internet-accessible device and the other Internet-accessible devices. The data packets contain all manner of personal information, such as Internet Protocol addresses, Media Access Control (MAC) addresses, e-mail addresses, mailing addresses, television viewing preferences, television viewing history, photographic archives, personal or family activity schedules, address books, websites, audio files, video files, travel itineraries, etc. and can be exchanged via the fourth communications link between the first Internet-accessible device and the other Internet-accessible devices of the users at Block 580.

Note that the initial contact, exchange of identification information, establishment of a data link, and transfer of personal information can occur using a plurality of communications links if desired. In the preferred embodiment, voice communication is used for the first link, while the same communication media is used for the second, third and fourth links.

Current identification information is maintained by the Internet-accessible devices to allow a communications link to be continuously accessible by the Internet-accessible devices, as illustrated at Block 600.

While the invention has been particularly shown and described with reference to a preferred embodiment, it will be understood by those skilled in the art that various changes in form and detail may be made therein without departing from the spirit and scope of the invention.

What is claimed is:

1. A method for establishing a data link between users of set-top boxes and sharing data through the data link, comprising:

establishing contact between the users of a plurality of set-top boxes through a first transmission media;

initiating a data transfer between die plurality of set-top boxes using a second transmission media;

exchanging identification information between the plurality of set-top boxes using a third transmission media;

using the identification information to establish a data link between the plurality of set-top boxes using a fourth transmission media;

exchanging a plurality of data packets between the plurality of set-top boxes over the data link; and maintaining current identification information between the plurality of set-top boxes to allow the data link to be continuously accessible by the plurality of set-top boxes, wherein at least one of the plurality of set-top boxes contains a transmit/receive device for the transmission and reception of the plurality of data packets and wherein establishing contact between the users of a plurality of set-top boxes through a first transmission media comprises establishing a communication link between a first transmit/receive device of a first set-top box and a second transmit-receive device of a second set-top box, further comprising:

the first transmit/receive device switching into an analog circuit of the first telephony device and sending a synchronization sequence for receipt by the second transmit/receive device of the second telephony device; and the second telephony device detecting the synchronization sequence, muting a handset of the second telephony device, and coupling a plurality of telephone signals of the second telephony device to the second transmit/receive device of the second telephony device.

2. The method of claim 1, wherein the first transmission media includes a plurality of telephony devices coupled to the set-top boxes.

3. The method of claim 2, wherein the plurality of telephony devices comprises a plurality of telephones.

4. The method of claim 2, wherein one or more of the telephony devices of the first transmission media comprises a telephone coupled to a set-top box of the plurality of set-top boxes.

5. The method of claim 2, wherein a first telephony device of the plurality of telephony devices coupled to a first set-top box is able to communicate with the plurality of telephony devices coupled to the plurality of set-top boxes using a Public Switched Telephone Network contained within the first transmission media.

6. The method of claim 5, wherein the first telephony device comprises a telephone.

7. The method of claim 2, wherein a first telephony device coupled to a first set-top box is operable to communicate with the plurality of telephony devices coupled to the plurality of set-top boxes using the Internet.

8. The method of claim 1, wherein the second transmission media comprises the first transmission media.

9. The method of claim 1, wherein the third transmission media comprises the second transmission media.

10. The method of claim 1, wherein the second and the third transmission medium comprise the first transmission media.

11. The method of claim 1, wherein the second, third, and fourth transmission medium comprise the first transmission media.

12. The method of claim 1, wherein the second transmission media comprises the Internet.

13. The method of claim 1, wherein the second transmission media comprises a Public Switched Telephone Network.

14. The method of claim 1, wherein at least one of the plurality of set-top boxes contains a transmit/receive device for the transmission and reception of the plurality of data packets.

15. The method of claim 1, wherein the data transfer initiated by a first user of the users of the plurality of set-top boxes occupies the first transmission media used to establish contact between the plurality of users, thereby temporarily halting a voice communication between the first user and the plurality of users.

16. The method of claim 1, wherein an amount and a type of identification information exchanged varies depending upon a security policy defined for the users of the plurality of set-top boxes.

17. The method of claim 1, wherein the identification information exchanged includes acknowledgment information.

18. The method of claim 1, wherein establishing the data link includes exchanging acknowledgment information between the plurality of set-top boxes.

19. The method of claim 1, wherein the data transmitted after establishing the data link includes a plurality of voice packets, thereby bypassing a public switched telephone network.

20. The method of claim 1, wherein the data transmitted after the establishment of the data link over the data link includes one or more of Internet Protocol addresses, Media Access Control (MAC) addresses, e-mail addresses, mailing addresses, television viewing preferences, television viewing history, photographic archives, personal or family activity schedules, address books, websites, audio files, video files, and travel itineraries.

21. The method of claim 1, wherein each set-top box of the plurality of set-top boxes transmits notification of a change in its data link availability to the plurality of set-top boxes to enable the plurality of set-top boxes to access the data link between said plurality of set-top boxes.

22. The method of claim 1, wherein at least one of the first, second, third and fourth transmission media includes one or more of an Internet, a Public Switched Telephone Network, a microwave communication system, an optical communication system, a cable communication system, and a radiofrequency communication system.

23. The method of claim 1, wherein at least one of the first, second, third and fourth media includes a first cable headend coupled to a first input/output terminal of the first set-top box, and a second cable headend coupled to a plurality of input/output terminals of the plurality of set-top boxes.

24. The structure of claim 23, wherein the first and second cable headends are the same.

25. The structure of claim 23, wherein at least one of the first, second, third and fourth transmission media includes an Internet coupled to a first input/output terminal of the first cable headend and coupled to a first input/output terminal of the second cable headend.

26. The system of claim 23, wherein at least one of the first, second, third and fourth transmission media includes a public switched telephone system coupled to a first input/output terminal of the first cable headend and coupled to a first input/output terminal of the second cable headend.

* * * * *

UNITED STATES PATENT AND TRADEMARK OFFICE
CERTIFICATE OF CORRECTION

PATENT NO. : 7,116,644 B2  Page 1 of 1
APPLICATION NO. : 09/993339
DATED : October 3, 2006
INVENTOR(S) : Eyer et al.

It is certified that error appears in the above-identified patent and that said Letters Patent is hereby corrected as shown below:

In col. 7, line 44, delete "CETM." and insert --CE$^{TM}$,-- therefor.

Claims:
Claim 1
In col. 10, line 41, delete "die" and insert --the,-- therefor.

Signed and Sealed this

Thirtieth Day of January, 2007

JON W. DUDAS
*Director of the United States Patent and Trademark Office*